3,254,079
AMINO ALCOHOL ETHERS OF PHENOTHIAZINES
Margaret H. Sherlock, Bloomfield, N.J., assignor to Schering Corporation, Bloomfield, N.J., a corporation of New Jersey
No Drawing. Filed Jan. 17, 1963, Ser. No. 252,033
3 Claims. (Cl. 260—243)

This invention relates to compositions of matter identified as cycloamino alcohol ethers of N-alkylene phenothiazines which are valuable antibacterial substances.

The invention sought to be patented in its composition aspect is described as residing in the concept of a chemical compound having the molecular structure of phenothiazine and its S-oxides, said structure being substituted in the benzenoid portion thereof by a member of the group consisting of hydrogen, halogen, trifluoromethyl, lower alkanoyl, lower alkoxy, lower alkylthio, lower alkyl and di-lower-alkylsulfamyl and having attached to the nitrogen atom at the 10 position the grouping

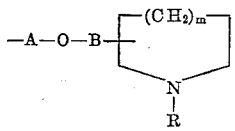

wherein A is an alkylene chain of from 2 to 12 carbon atoms, B is an alkylene chain of from 0 to 3 carbon atoms, $m$ is a whole number less than 2 and R is a member of the group consisting of hydrogen and lower alkyl.

The new compounds of this invention are represented by the general formula:

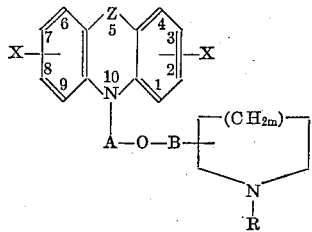

wherein:

Z represents —S—, —SO—, or —SO$_2$—,

X represents H, halogen, trifluoromethyl, lower alkyl, lower alkoxy, lower alkylthio, lower alkanoyl and N-di-lower alkylsulfamyl, A represents a divalent straight or branched aliphatic chain containing 2 to 12 carbon atoms, B represents an alkylene chain containing 0 to 3 carbon atoms, M represents a whole number less than 2 (which includes 0) and R represents hydrogen or lower alkyl.

In the foregoing, the preferred representation for X is halogen, preferably chloro. As indicated X can be lower alkyl, e.g. methyl, ethyl, propyl and the like, lower alkoxy e.g. methoxy, lower alkylthio e.g. methylthio, lower alkanoyl e.g. acetyl and propionyl, and di-lower alkylsulfamyl, e.g. dimethylsulfamyl. The bridge, A, between the phenothiazinyl nitrogen and the ether oxygen, is a divalent aliphatic chain such as ethylene, propylene, up to dodecylene including the branched variations thereof. The cyclic amino group is either a piperidyl or a pyrrolidyl group which is linked to the ether oxygen through an alkylene group or directly attached (as when the number of carbon atoms in B is 0).

Included within the foregoing formula are the acid addition salts of the basic ethers with organic and inorganic acids, especially non-toxic acids. These salts are easily prepared by methods well known in the art. For example, the basic ether is reacted with the calculated quantity of acid in an aqueous miscible solvent such as ethanol and the salt obtained by concentration. Alternatively the salt may be formed by adding the acid to a solution of the base in which the salt is insoluble, such as ether or chloroform, from which the salt separates directly. Examples of salts are those with hydrogen halide, preferably chloride, sulfuric, and phosphoric acids, and organic acids such as maleic, fumaric, alkylsulfonic, succinic and the like.

The compounds of this invention are prepared from the appropriately substituted phenothiazine which is either known to the art or prepared by well described methods. N-alkylation of the phenothiazine with an alkylene dihalide preferably a chlorobromo alkane gives rise to the intermediary 10-chloroalkyl-phenothiazine. This intermediate is then reacted with the appropriate amino alcohol in order to form the desired ether.

The alkylation of the phenothiazine as indicated is effected with a dihalo alkane in the presence of a condensing agent such as sodamide or sodium hydride in liquid ammonia. The positions of the halogen atoms on the alkane determines the configuration of the alkylene bridge, A. It is preferred to employ a chloro-bromoalkane so as to afford an intermediate of unequivocal structure since the bromo group reacts in preference to the chloro group. Thus if a 3-carbon chain is desired, 1-bromo-3-chloro-propane is employed. For any other straight chain, the appropriate α-bromo-ω-chloro alkane is employed. In order to obtain branching, a bromo-chloro alkane having the chloro on other than a terminal carbon is utilized or one utilizes a dihalo alkane which is already branched. Other condensing agents are potassium amide and lithium amide or the alkylation may be effected in the presence of alkali metal carbonates in an inert solvent like toluene or xylene.

The 10-halo alkyl phenothiazine formed, supra, is then reacted with the appropriate cyclic amino alcohol in the presence of a condensing agent such as described for the alkylation of the phenothiazine itself. It is preferred to use sodamide in an inert solvent such as toluene, however, an excess of the amino alcohol itself may be used to take up the hydrogen chloride formed in the reaction.

The ethers may be formed in a converse manner from the reaction of a hydroxy alkyl phenothiazine and an amino alkyl halide. The first described procedure is preferred for reasons including availability of starting materials.

Representative of the amino alcohols employed herein are the piperidinols such as N-methyl-3-piperidinol, N-ethyl-3-piperidinol, N-methyl-4-piperidinol and their N-desalkyl analogs; the pyrrolidinols such as N-methyl-3-pyrrolidinol, N-ethyl-3-pyrrolidinol and the N-desalkyl analogs thereof; piperidyl alaknols such as N-methyl-3-piperidyl methanol, 2-(N-methyl-4-piperidyl)-ethanol, N-methyl-3-pyrrolidyl-methanol and the like.

The compounds of this invention exhibit a unique antimicrobial activity pattern. They are inhibitory to gram-positive bacteria and oragnisms such as species of Monilia and Trichlophyton, in particular *M. albicans* and *T. mentographytes*. The novel compounds exhibit activity against other organisms such as *Staphylococcus aureus* and *M. smegmatis*. Thus the novel compounds are useful for destroying or inhibiting the growth of micro-organisms represented by the foregoing. Solutions of salts of the compounds are useful in "sterilizing" glassware and the like by destroying inhibitable organisms such as those mentioned hereinabove.

The following examples are illustrative of the preferred method for preparing the compounds of this invention.

EXAMPLE 1

*N-alkylation of a substituted phenothiazine 10-(3-chloropropyl)-2-chlorophenothiazine*

Suspend sodamide (from 3 g. of sodium) in 300 ml. of liquid ammonia and add 30 g. of 2-chlorophenothiazine. Stir 1 hr. and add 19 g. of 1-bromo-3-chloro-propane. Allow ammonia to evaporate and add 200 ml. of water to the residue. Extract with ether, dry ether extract over sodium sulfate, filter and concentrate to a residue. The residue, as a viscous oil, comprises 10-3-(chloropropyl)-2-chlorophenothiazine and is used without purification in the next step whereby an ether is formed.

By varying the starting phenothiazine or the dihalo alkane the appropriate intermediate for any of the compounds of this invention is prepared.

EXAMPLE 2

*Etherification with a cyclic amino alkyl alcohol 10[3-(N-methyl - 3 - piperidylmethoxy)-propyl]-2 - chloro phenothiazine*

Add 15.5 g. of N-methyl-3-piperidyl carbinol to a suspension of sodamide (from 2.76 g. of sodium) in 210 ml. of toluene. Reflux for 2.5 hours. Add 31 g. of 10(3-chloropropyl)-2-chlorophenothiazine in 50 ml. of toluene and reflux for 17 hours. Cool and acidify with dilute aqueous hydrogen chloride. Separate the aqueous phase and render alkaline with aqueous sodium hydroxide. Extract with ether. Dry ether solution, concentrate and distill in vacuo to obtain the compound of this example, B.P. 270–276°/5 mm.

A hydrochloride prepared and crystallized from methylethyl ketone as a semi-hydrate melts at 93–95° C.

By substituting the appropriate 10-haloalkyl phenothiazine and cyclic amino alkanol in the foregoing, the various compounds of this invention are prepared.

EXAMPLE 3

*Etherification with a cyclic amino alcohol 10-[3-(N-ethyl-3-piperidyloxy)propyl]-2-chlorophenothiazine*

By substituting N-ethyl-3-piperidinol for the carbinol in Example 2 and following the procedure described therein there is obtained the compound of this example, B.P. 262–266°/4 mm., hydrochloride crystallized from methyl ethyl ketone, M.P. 147–150° C.

By substituting the appropriate cyclic amino alcohol and appropriate 10-halo alkyl phenothiazine in the foregoing, the various basic ethers of this invention having the oxygen atom linked directly to the heterocyclic ring through a ring carbon atom are obtained.

By making appropriate substitution in the foregoing examples the various compounds representing this invention are prepared. Thus from 2-trifluoromethyl phenothiazine and 1,5-dibromo pentane there is formed 10-(5-bromopentyl)-2-trifluoromethyl phenothiazine which upon reaction with N-methyl - 3 - pyrrolidinol yields 10-[5-(N-methyl-3 - pyrrolidinyloxy)-pentyl]-2 - trifluoro methyl phenothiazine.

In the following tabulation are shown representative starting phenothiazines, alkylene bridges and cyclic amino alcohols which when pieced together form the appropriately substituted end products.

| Phenothiazine | Alkylene Bridge at the 10-Position | Cyclic Amino Alcohol |
|---|---|---|
| 2-acetyl | —CH$_2$(CH$_2$)—CH$_2$— | N-ethyl-4-piperidinol. |
| 2-methylthio | —CH$_2$—CH—CH$_2$— <br> $\quad\quad\quad$ CH$_3$ | 2-(N-methyl-2-piperidyl)-ethanol. |
| H | —CH$_2$(CH$_2$)$_4$CH$_2$— | N-methyl-2-piperidyl methanol. |
| 2-Cl | —CH$_2$—CH$_2$— | N-methyl-3-pyrrolidyl methanol. |
| 2-methoxy | —CH$_2$CH$_2$CH$_2$— | 2-(N-ethyl-2-piperidyl)-ethanol. |
| 2-SO$_2$N(CH$_3$)$_2$ | —CH$_2$(CH$_2$)$_2$CH$_2$— | 2-(N-ethyl-4-piperidyl)ethanol. |
| 2,6-dichloro | —CH$_2$CH$_2$—CH$_2$— | N-ethyl-4-piperidinol. |
| 3-Cl | —CH$_2$(CH$_2$)$_3$—CH$_2$— | N-ethyl-3-piperidinol. |
| 2-ClS-oxide | —CH$_2$CH$_2$CH$_2$— | N-methyl-3-piperidyl methanol. |
| 2-ClS-dioxide | —CH$_2$CH$_2$CH$_2$— | N-methyl-4-piperidinol. |

I claim:
1. A composition of matter of the group consisting of basic ethers and the acid addition salts thereof, said basic ethers having the structural formula:

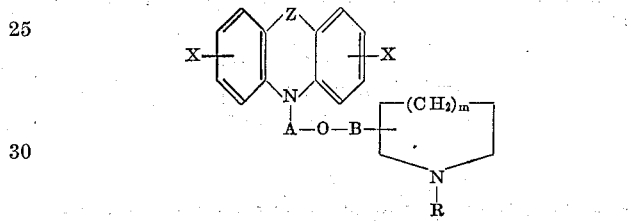

wherein X is a member of the group consisting of hydrogen, lower alkyl, lower alkoxy, lower alkylthio, trifluoromethyl, halogen, lower alkanoyl and lower dialkylsulfamyl, A is a hydrocarbon alkylene chain having 2 to 12 carbon atoms, B is a hydrocarbon alkylene chain having 0 to 3 carbon atoms, m is a whole number less than 2, R is a member of the group consisting of H and lower alkyl and Z is a member of the group consisting of S, SO, and SO$_2$.

2. 10 - [3-(N-methyl-3 - piperidylmethoxy)-propyl]-2-chlorophenothiazine.

3. 10-[3-(N-ethyl - 3-piperidyloxy)-propyl] - 2-chlorophenothiazine.

References Cited by the Examiner

UNITED STATES PATENTS

| | | | |
|---|---|---|---|
| 2,217,566 | 10/1940 | Smith | 167—33 |
| 2,908,683 | 10/1959 | Jacob et al. | 260—243 |
| 2,931,810 | 4/1960 | Yale et al. | 260—243 |
| 2,944,053 | 7/1960 | Edgerton | 260—243 |
| 2,945,030 | 7/1960 | Gordon | 260—243 |
| 2,951,077 | 8/1960 | Meyers et al. | 260—243 |
| 2,976,286 | 3/1961 | Schindler et al. | 260—243 |
| 2,997,468 | 8/1961 | Schwartz | 260—243 |
| 3,000,886 | 9/1961 | Edgerton et al. | 260—243 |
| 3,038,896 | 6/1962 | Habicht et al. | 260—243 X |
| 3,126,379 | 3/1964 | Davis | 260—243 |

FOREIGN PATENTS

| | | |
|---|---|---|
| 213,402 | 2/1961 | Austria. |
| 831,091 | 4/1960 | Great Britain. |

JOHN D. RANDOLPH, *Acting Primary Examiner.*